No. 648,899. Patented May 1, 1900.
I. P. DILLON.
RAG BEATER FOR PAPER MANUFACTURE.
(Application filed Dec. 22, 1899.)
(No Model.)
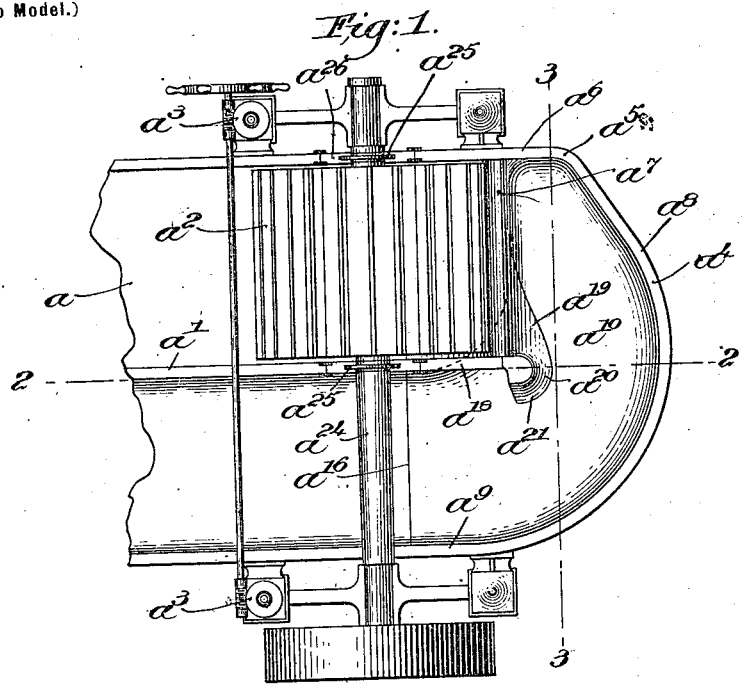
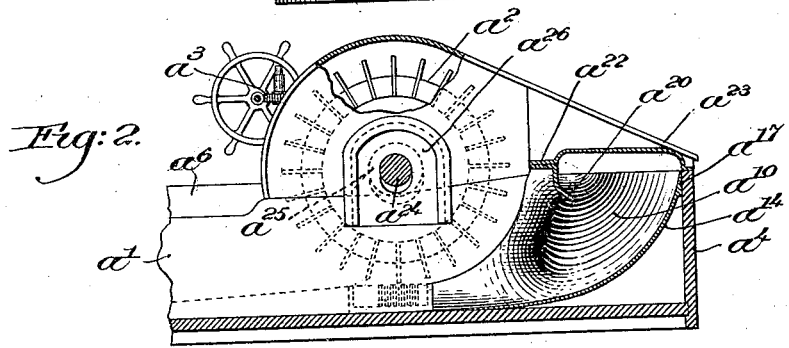
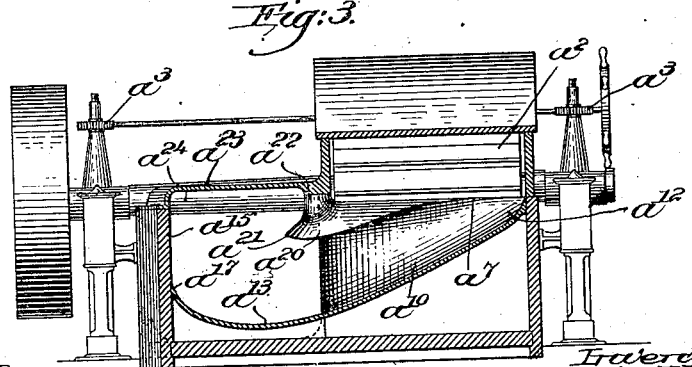
Witnesses,
Edward H. Allen.
Thomas J. Drummond.
Inventor,
Erwin P. Dillon,
by Crosby & Gregory
attys.

UNITED STATES PATENT OFFICE.

IRWIN P. DILLON, OF LAWRENCE, MASSACHUSETTS.

RAG-BEATER FOR PAPER MANUFACTURE.

SPECIFICATION forming part of Letters Patent No. 648,899, dated May 1, 1900.

Application filed December 22, 1899. Serial No. 741,239. (No model.)

*To all whom it may concern:*

Be it known that I, IRWIN P. DILLON, a citizen of the United States, residing at Lawrence, county of Essex, State of Massachusetts, have invented an Improvement in Rag-Beaters for Paper Manufacture, of which the following description, in connection with the accompanying drawings, is a specification, like letters on the drawings representing like parts.

My invention is an improved beating-engine for beating paper-waste, rags, &c., into a pulp or macerated mass, and relates more particularly to the form of the tank at the end containing the beater, being an improvement on the form of device shown in my United States Patent No. 524,497, granted August 14, 1894. In my said patent I provided means for causing the stuff to turn over, consisting of a special formation of the back-fall and adjacent trough, the back-fall being cut under at the end thereof adjacent the mid-board and the trough shaped to direct the stuff with a twisting movement, so that the inner portion thereof would pass over the outer portion thereof, the latter being deflected by the rear wall of the trough, so as to be directed into the undercut part of the back-fall, the undercut of the back-fall resulting in an overhanging part or apron which would serve to shoot out the inner part of the flowing stuff over the outer part thereof, as explained.

In practice I have found that the broad idea covered by my aforesaid patent is correct and the machine works in a very superior manner, and the present invention aims at producing the results above alluded to more accurately and perfectly than before; and to this end I have extended the inner top edge of the back-fall so that it projects considerably over the stuff and have deflected its projecting edge downwardly, so as to dip toward the bottom sufficiently to act as a deflecting-plate for the flowing stuff; and a further feature of my invention resides in giving the rear wall at its end adjacent the outer side of the beater side of the tank a rearward curvature extending rearwardly toward the central line of the tank. I also make the higher end of the trough quite shallow and narrow, while the trough from its highest point onward is broadened out rapidly. In short, I have improved the shape of the trough and adjacent parts in a large number of details, including those above pointed out, as well as those hereinafter referred to, or as will be more particularly explained in connection with the following description, taken in connection with the accompanying drawings, in which I have shown a preferred embodiment of my invention, and the latter will be more particularly defined in the appended claims.

In the drawings, Figure 1 is a top plan view of a sufficient portion of the tank and beater to make my invention clear, the bonnet shown in Figs. 2 and 3 being removed. Fig. 2 is a central longitudinal vertical section thereof, taken on the line 2 2, Fig. 1. Fig. 3 is a transverse vertical section taken on the line 3 3, Fig. 1.

The tank proper, $a$, mid-board $a'$, beater $a^2$, adjusting mechanism $a^3$ therefor, and general details of the beating-engine may be of any usual or preferred kind and arrangement, my invention relating to the back-fall and trough end of the tank, as exhibited at the right end of Figs. 1 and 2. The back wall $a^4$ instead of simply being rounded with a more or less square corner is given a more or less convolute shape, being joined at $a^5$ to the outer side $a^6$ in a curve more or less approaching a straight line to a point $a^8$ about opposite the middle of the back-fall $a^7$, whence it is carried in a wide sweep approximately on a circular curve to the side wall $a^9$.

For convenience of description I have termed the inclosed space a "trough," (designated as $a^{10}$.) The bottom of said trough at its narrow end is quite shallow, as indicated at $a^{12}$, Fig. 3, having a slight downward slanting curvature at the narrowest part or extreme upper end of said trough, and thence sloping with a very slight curvature or approximately on a straight line to adjacent the center line of the side of the engine opposite the beater, as indicated at $a^{13}$, Fig. 3. At its rear side the trough has preferably a gradual continuous slanting curve, as indicated at $a^{14}$, as far as or slightly beyond the point of alinement thereof with the mid-board, and from said point onward the trough has a vertical wall $a^{15}$, increasing in extent or depth thence to the lowermost end $a^{16}$.

The bottom and main portion of the trough just described are herein shown as consisting of a casting whose upper edge $a^{17}$ is substantially flush with the framework or tank end proper at the upper right-hand portion of Fig. 1, and in the lower right-hand part of said Fig. 1 descends obliquely along the tank end until it approximately coincides with the bottom of the trough at $a^{16}$.

While I have in the above explanation described all the details of shape minutely, I wish it understood that I do not limit my invention in all the particulars set forth inasmuch as the general ideas of curvature are new and produce greatly-improved results even though all the features explained are not used together or are not employed in their most finished form. I have endeavored above to explain the curves and shape precisely and definitely in order that those skilled in the art might fully and completely understand the same; but by so doing I do not limit myself to such an extent as to prevent wide variations therefrom in details of curvature and form.

The undercut portion of the back-fall $a^7$ is indicated by dotted line $a^{18}$ in Fig. 1 and is indicated by shading in Fig. 2, from which it will be seen that at its lower part it is more undercut than at its upper part, which slopes downwardly toward the beater, whereas the surface of the back-fall at the end thereof slopes downwardly away from the beater, the two opposite curvatures merging into each other, the object being to give the stuff as much of a tendency to twist or form a vortex as possible as it is deflected by the rear wall $a^8$ and plunges forward with an undercurve against or toward the undercut part of the back-fall. Above this undercut part of the back-fall I provide an overhanging or roof-like projecting plate $a^{19}$, extending along the top of the back-fall approximately half the length thereof at the end toward the mid-board, this plate overhanging the undercut part slightly and thence being bent diagonally forward, as shown more clearly in Fig. 2, so as to provide on its depending forward edge $a^{20}$, at the part thereof in line with the mid-board and at the side thereof away from the beater, a retainer or guide flange or rib, this depending part of said plate being brought around the end of the mid-board in a curvature $a^{21}$, as indicated in Fig. 1, so that the lower edge of said plate acts as a guide or retainer to catch and deflect or retain the surface part of the stuff as it flows toward and along the undercut part of the back-fall. At its upper end the guide-plate or retainer $a^{19}$ has preferably a post-like round projection or turning-center $a^{22}$, preferably bearing against the end of the mid-board and serving to give an easy slipping flow to the stuff whenever the stuff gets as high as that point in the tank and also prevents the tendency of the stuff to clog at this point. As the stuff at the outside pours over the back-fall, it is directed back beneath the retainer $a^{19}$, whereas the stuff at the inside is deflected by the upper surface of the plate or retainer $a^{19}$, so as to shoot off toward the far side of the tank, and is also prevented from joining the other portion of flowing stuff by the turning-center $a^{22}$, whose base and rounded sloping shape overhang or project laterally beyond and away from the mid-board on the side of the latter opposite the beater, whereby some of the stuff may flow under the said overhanging post or turning-center and its flaring base, and some of the stuff may flow from the inner end of the back-fall onto said base and be carried thereby and directed toward the outside of the tank opposite the beater. The guide-plate $a^{19}$ merges into the back-fall at the outer end of said plate and grows gradually broader throughout its length as far as the mid-board, the free edge of said plate extending obliquely outward and downward away from said back-fall toward the broader end of the plate, so as to provide a substantially-arched cavity adjacent the undercut portion of the back-fall for the stuff which passes over the outer end of the back-fall. Preferably extending from adjacent the rounded end or turning-post $a^{22}$ is a bonnet $a^{23}$, spanning or arching over the trough to the opposite wall $a^9$ of the tank, so as to prevent all slopping and spattering of the flow of the stuff owing to the extreme agitation of the stuff produced by the special formation of the trough, as above explained.

It will be understood that the shape of tank end which I have devised gives an extremely thorough and complete "turning over" to the stuff; but all this is accomplished by the force of gravity rather than by mechanical power, being produced simply by providing the proper deflecting and opposing planes of impact for the stuff to strike against and for directing and turning and diverting the heavy flow of stuff as it is poured over the back-fall by the beater $a^2$.

In order to prevent any seeping through of the liquid at the joints of the beater-shaft $a^{24}$, I mount on said shaft thin radial disks $a^{25}$, which run in grooves cut therefor in housings $a^{26}$, so that as the shaft rotates the joints are practically sealed against the escape of the liquid, and because of the radial extent of these disks $a^{25}$ the vertical adjustment of the shaft is possible, as indicated in dotted lines in Fig. 2, without permitting the escape of the liquid.

In operation the stuff which has been flowing at the outside portion of the tank adjacent the wall $a^9$ upon being driven by the beater over the back-fall strikes against the shallow and peculiarly-curved part of the trough and is at once deflected not only toward the left, Fig. 3, but also slightly toward the left, Fig. 1, and downwardly as well, due to the curve, Fig. 2. At the same time the stuff which has been flowing at the inner portion of the tank adjacent the mid-board $a'$ is driven over the back-fall and directed partly by the plate $a^{19}$ and mainly by the wall $a^4$ of the trough to the left, Figs. 3 and 1, the shape of the trough causing said portion of the stuff to flow against the outer wall of the tank and maintain the outside path in said tank as said stuff continues onward around to the beater again. The stuff which pours over the outside end of the back-fall against the oblique and approximately-straight part $a^8$ of the end wall upon being deflected toward the undercut part of the back-fall rushes beneath the higher arched part of the overhanging plate $a^{19}$ and beneath the stream of stuff which is flowing over said plate and is then caught or guided between the depending outer and lower end $a^{21}$ of said guide-plate or retainer $a^{19}$ and the forwardly and downwardly sloping undercut part of the back-fall, as indicated at $a^{18}$, and is thereby compelled to retain its position adjacent the mid-board, so that it eventually comes around to the beater again in reversed position from that occupied by it previously. This result has been the object sought in various beating-engines previously devised, but by entirely different mechanism and with more or less inferior results.

One of the main difficulties in this class of machines is that the stuff, especially at the beginning of the beating process, is very liable to settle, so that at times the entire mass of stuff in the tank will become stationary. This cannot take place in my machine for the reason that the turning over of the stuff after it leaves the beater $a^2$ is not due to the movement given thereto by the beater, but is due to the force of gravity acting upon the stuff as it falls and flows along the variously curved and shaped surfaces and coöperating parts, as already fully explained.

I have already stated that I did not limit myself in all the respects shown and explained, and I therefore repeat that it is my intention to cover my invention broadly, as more particularly set forth in the following claims.

Having fully described my invention, what I claim is—

1. In a beating-engine, a mid-board, a beater and a back-fall over which the stuff is driven by said beater, said back-fall at its inner end adjacent said mid-board having an overhanging plate, the free projecting edge of said plate extending downwardly at the end thereof adjacent said mid-board, to constitute a retaining or guiding device for the flowing stuff, substantially as described.

2. In a beating-engine, a mid-board, a beater, and a back-fall over which the stuff is driven by said beater, said back-fall at its inner end adjacent said mid-board having an overhanging plate, the free projecting edge of said plate extending downwardly at the end thereof adjacent said mid-board and extending partially around the end of said mid-board in a curve approximately concentric thereto, substantially as described.

3. In a beating-engine, a mid-board, a beater and a back-fall over which the stuff is driven by said beater, said back-fall at its inner end adjacent said mid-board having an overhanging plate, said plate having at the end thereof in line with said mid-board a post-like projection with a curved surface for the stuff to flow around, substantially as described.

4. In a beating-engine, a tank, containing a mid-board, a beater, and a back-fall over which the stuff is driven by said beater, means for turning the stuff over and causing the peripheral flow thereof to reverse places in the tank with the mid-board flow thereof after passing said beater, and an overhanging depending device extending downwardly into the path of the flow of the stuff at the end of said mid-board on the side thereof away from said beater, substantially as described.

5. In a beating-engine, a tank, containing a mid-board, a beater, and a back-fall, said back-fall being undercut at the end thereof adjacent said mid-board and having a plate extending forward from the top of the back-fall, said plate extending along said back-fall approximately half the length thereof, and growing uniformly broader throughout its length approximately as far as said mid-board, the free edge of said plate extending obliquely downward and away from said back-fall from the narrow end of the plate to the broad end thereof, whereby a substantially-arched cavity is provided adjacent said undercut portion of the back-fall for the passage of the stuff driven over the outer end of the back-fall opposite the mid-board, substantially as described.

6. In a beating-engine, a tank, containing a mid-board, a beater, and a back-fall, said back-fall at the end thereof adjacent said mid-board being undercut, the surface of said back-fall opposite said beater and at the outer end of the back-fall sloping downwardly away from the beater, and thence curving toward said undercut portion and sloping downwardly toward said beater at the end of said undercut next to said mid-board, substantially as described.

7. In a beating-engine, a tank, a beater, a back-fall and a trough at the end of the tank adjacent said beater to receive the stuff driven by said beater over the back-fall, said trough being narrow at its upper end and continually broader toward its lower or discharge end, the bottom of said trough being shallow with only a slight curvature at its upper end and extending thence downwardly in approximately a straight line to about the median line of the division of the tank opposite said beater, the rear wall curving gradually at all points throughout its length with a gradual descent toward and adjacent to the beater side of the trough, the beginning of said curvature being approximately flush with the top edge of the tank throughout the more shallow part of the trough and thence descending gradually approximately to the bottom of the trough at the discharge end thereof, substantially as described.

8. In a beating-engine, a tank, a mid-board, a beater, a back-fall, said back-fall being in line with the end of the mid-board, and a rounded vertical turning-center adjacent the junction of the back-fall and mid-board for the stuff to turn around at the end of the tank, substantially as described.

9. In a beating-engine, a tank, a mid-board, a beater, a back-fall, said back-fall being in line with the end of the mid-board, and a rounded vertical turning-center adjacent the junction of the back-fall and mid-board for the stuff to turn around at the end of the tank, said rounded turning-center having a flaring, sloping base at a level to come beneath the normal surface of the stuff, substantially as described.

10. In a beating-engine, a tank, a mid-board, a beater, a back-fall, said back-fall being in line with the end of the mid-board, and a rounded turning-center adjacent the junction of the back-fall and mid-board for the stuff to turn around at the end of the tank, said rounded turning-center having a flaring, sloping base adjacent but below the top level of the tank, said base and turning-center projecting laterally beyond and away from said mid-board on the side thereof opposite the beater, substantially as described.

In testimony whereof I have signed my name to this specification in the presence of two subscribing witnesses.

IRWIN P. DILLON

Witnesses:
GEO. H. MAXWELL,
JOHN C. EDWARDS.